United States Patent
Mlinaric

(10) Patent No.: US 6,852,764 B2
(45) Date of Patent: Feb. 8, 2005

(54) BLEND FOR MASTERBATCHES

(75) Inventor: Jean-Marie Mlinaric, Biesme (BE)

(73) Assignee: Atofina Research S.A., Feluy (BE)

( * ) Notice: Subject to any disclaimer, the term of this patent is extended or adjusted under 35 U.S.C. 154(b) by 120 days.

(21) Appl. No.: 10/149,091

(22) PCT Filed: Dec. 7, 2000

(86) PCT No.: PCT/EP00/12869

§ 371 (c)(1),
(2), (4) Date: Sep. 16, 2002

(87) PCT Pub. No.: WO01/42354

PCT Pub. Date: Jun. 14, 2001

(65) Prior Publication Data

US 2003/0050353 A1 Mar. 13, 2003

(30) Foreign Application Priority Data

Dec. 8, 1999 (EP) ............................................ 99124497

(51) Int. Cl.$^7$ .................................................. C08J 9/00
(52) U.S. Cl. ........................... 521/149; 521/150; 521/97
(58) Field of Search ................................ 521/150, 149, 521/97

(56) References Cited

U.S. PATENT DOCUMENTS 6,085,923 A * 7/2000 Yaniger ...................... 215/355
2002/0017734 A1 * 2/2002 Sugihara et al. .............. 264/51

* cited by examiner

Primary Examiner—Morton Foelak
(74) Attorney, Agent, or Firm—William D. Jackson

(57) ABSTRACT

Provided is a blend comprising: a) from 20 to 60 wt % of a thermoplastic elastomer; b) from 8 to 30 wt % of a vinylaromatic polymer; c) from 10 to 30 wt % of one or more processing aid; d) from 0 to 20 wt % of one or more additives.

12 Claims, No Drawings

BLEND FOR MASTERBATCHES

FIELD OF THE INVENTION

The invention concerns a blend of styrene butadiene elastomers, polystyrene, oil and additives and the use of said blend to produce molded closures for containers.

BACKGROUND OF THE INVENTION

Several rubbery compositions and their applications have already been described in the prior art.

FR 2.114.383 relates to impact resistant styrene polymers having good flow properties and which can be easily moulded without forming fish eyes.

GB 2.147.906 discloses block copolymer composition comprising at least one thermoplastic elastomeric block copolymer, a polymer of a monoalkenyl aromatic hydrocarbon and a random copolymer. This composition is especialy suitable as shoe upper stiffener.

WO 96/16122 discloses a composition useful for preparing elastomeric articles such as films, fibers, woven and non-woven articles. The composition comprises thermoplastic elastomers blended with other polymers to improve their processing.

U.S. Pat. No. 4,306,034 relates to rubbery compositions and molded polymeric articles therefrom that stimulate the appearance of natural plantation crepe rubber. Those compositions comprise e.g. polarizing agents.

Abstract Derwent of JP 62 256 845 discloses a rubbery composition suitable for structural materials of noise insulating sheets and vibration insulators and for backing materials of carpets.

Abstract Derwent of JP 63 057 663 relates to heat resistant gasket for syringes comprising thermoplastic elastomer consisting of block copolymer, polyphenylene ether resin, paraffinic oil and polyolefin and/or polystyrene.

Abstract Derwent of JP 63 118 359 relates to thermoplastic elastomer composition for shoe sole prepared by adding process oil, inorganic filler and thermoplastic resin to thermoplastic elastomer.

GB 1,196,127 discloses thermoplastic compositions comprising at least 75% by weight of a thermoplastic material. Those compositions are particularly useful for making sealing gaskets for container closures.

The closure of containers, in particular wine bottles, is becoming an important issue because the supply of natural cork is not keeping up with the increased demand for wine bottling in various parts of the world.

Several attempts have been made to replace natural cork with synthetic materials. These attempts are based on formulations that are, among others, adequate to be mixed with a blowing agent. The role of said blowing agent is to allow the creation of cells duplicating the cellular behaviour of natural cork. Among the disadvantages resulting from these attempts one can cite, for example, the lack of uniformity of the foamed resin leading to leakage of the containers, or the need to use additives such as sulfur dioxide as an oxygen scavenger that are detrimental to the quality of the contained liquid.

Particular polymers have been used to bring an improvement. Thus U.S. Pat. No. 5,855,287 describes a synthetic closure comprising hydrogenated styrene butadiene copolymers and at least 1 wt % of a blowing agent. Although this closure achieves its objective it is still unsatisfactory as regards to the relatively high cost of the raw materials used.

SUMMARY OF THE INVENTION

It is an aim of the present invention to achieve an improvement in terms of raw material savings while providing equal or superior mechanical properties.

According to the invention, this problem is solved by the use of a blend comprising a) from 20 to 60 wt % of a thermoplastic elastomer resulting from the copolymerisation of a vinyl aromatic monomer and a conjugated diene containing from 20 to 80 wt % of the vinylaromatic polymer and 80 to 20 wt % of the butadiene polymer, and b) from 8 to 30 wt % of a vinylaromatic polymer, and c) from 10 to 30 wt % of one or more processing aids and d) from 0 to 20 w % of one or more additives. The blend is used to produce masterbatches that are suited, after being mixed with a blowing agent, for the production of closures for liquid containers, such as bottles.

The blends in accordance with the invention can be adapted to a wide variety of processing aids, additives and blowing agents. They provide good mechanical properties and can be used in many applications requiring a tight closure for liquid containers, such as bottles.

Among the thermoplastic elastomers that can be used in accordance with the present invention, these of particular importance are produced according to a process operated in solution. Such process is known in the art, reference is made to EP-A-0084795 and EP-B-344140.

The vinylaromatic monomer that is particularly preferred is styrene and the preferred conjugated diene is butadiene.

These monomers are subjected to polymerisation in presence of initiators or catalysts that are generally non branched or branched alkyllithium with 3 to 8 carbon atoms. However, n- and s-buthyllithium are preferably used.

A coupling agent is used to allow specific molecular configuration of the resulting polymer. The coupling agent can be selected from among polyvinyl compounds, polyepoxides, polyisocyanates, polyamines, polyaldehydes, polyhalides, polyanhydrides, polyketones, polypoxyesters and polyesters. Among the several polyfunctional agents of coupling those of small residual toxicity are preferred. For example, EP-B-344140 discloses the use of polyfunctional coupling agent of the general formula $SiX_nR_{4-n}$ wherein X is a halogen, preferably Cl, R is an alkyl, cycloalkyl or aryl radical, preferably methyl, ethyl and/or phenyl and n is an integer from 2 to 4.The most frequently used coupling agent is $SiCl_4$.It is also known to use organic coupling agents carrying epoxy groups. Polymers of epoxidized hydrocarbons are used such as epoxidized vegetable oils such as epoxidized soybean oil and epoxidized linseed oil.

The styrene butadiene elastomer can be further subjected to an hydrogenation treatment to remove the remaining double bonds giving a copolymer of polystyrene-polyethylene-butylene-polystyrene.

The amount of styrene in the elastomer can vary between 25 and 80 wt % which in combination with the coupling agent allows to select required characteristics such as hardness, elongation and strength.

The presence of 8 to 25wt % of a vinyl aromatic polymer, preferably polystyrene is also required. A mixture of high impact polystyrene and general purpose polystyrene is preferred to reach the required hardness. The presence of between 15 to 27 wt % of a processing aid is required. Several oils can be used, such as a mixture of naphthenic and paraffinic oil. The role of these aids is to decrease the viscosity of the masterbatch allowing improved processing speed.

Optionally, one or more of up to 20 wt % additives can be used. Some additives also called fillers are used to decrease the production cost of the masterbatch. Among the many fillers known to those skilled in the art a preferred material is calcium carbonate in an amount of less than 15 wt %, preferably less than 10 wt %. Some other additives also called lubricity agents are used to improve the introduction of the cork in the containers. Among the lubricity agents we can cite salts of fatty acids such as calcium stearate.

Present blend is particularly suited to be mixed with blowing or foaming agents allowing the production of cells within the closure. These agents can be of the chemical or physical type or a combination thereof. Among the chemical agents one can cite diazoaminobenzene, benzene sulfonic acid hydrazide, N,N'-dimethyl-N,N'-dinitroterephthalamide, azobisisobutyronitrile, tetramethylene dinitrosodimethylurethane, p,p-oxybis(N-nitroso-N-methyl) benzenesulfonamide, urea-biuret (33:67), β-naphthalene sulfonic acid hydrazide, sodium bicarbonate-ctric acid (4:3), sodium bicarbonate-melamine (95:5), benzene-1,3-disulfonic acid dihydrazide, 1,6-di-n-decyl azobisformamide, biphenyl-4,4'-di(sulfonyl azide), benzene sulfonic acid N-phenyl hydrazide, diphenyl sulfone-3,3'-disulfonyl hydrazide, p,p'-oxybis(benzenesulfonyl hydrazide), 1,6-diphenyl azobisformamide, dinitrosopentamethylene tetramine, azodicarbonamide, p,p-oxybis (benzenesulfonyl semicarbazide), barium azodicarboxylate. Among the physical type, one can cite hydrogen, air, nitrogen, carbon dioxide, water vapor, hydrocarbons, oxygen-containing aliphatics, chlorinated hydrocarbons, chlorofluorohydrocarbons. A particularly preferred agent is a polyacrylonitrile polymer bead containing isobutane.

This compound is available in the commerce under the trade name of Expancell manufactured by AKZO of the Netherlands.

Surprisingly, the inventor has observed that the present blends allow to reach high mechanical properties while being able to be mixed with a variety of foaming agents. The blend is therefore an ideal candidate for several applications within the field of closures for liquid containing packages.

The following example illustrate the invention. However, this example is given merely by way of guidance and do not imply any limitations.

EXAMPLE

Several blends were prepared incorporating styrene butadiene elastomers. Finaprene 507 is a linear SBS containing 73% PS. Its MFI at 190° C./5 kg is of 7.5 g/10 min.

Finaprene 435 is a radial SBS (SiCl4 coupling) containing 31% PS. Finaprene 602F is a radial SBS (Vikoflex coupling) containing 40% PS. Its MFI at 190° C./5 kg is of 8.5 g/10 min.

| Composition | Wt % | | | |
|---|---|---|---|---|
| Finaprene 507 | 25 | 22.5 | 50 | 23.9 |
| Finaprene 435 | — | 22.5 | — | 23.9 |
| Finaprene 602F | 25 | — | — | — |
| General purpose polystyrene | 12.5 | 10 | 10 | 10.6 |
| High impact polystyrene | 10 | 10 | 10 | 16 |
| Oil | 20.5 | 23 | 23 | 24.5 |
| CaCo$_3$ | 7 | 7 | 7 | — |
| Calcium stearate | — | — | — | 1.1 |
| Mechanical properties | | | | |

-continued

| Composition | Wt % | | | |
|---|---|---|---|---|
| Hardness (Shore H) | 84 | 86 | 97 | 89 |
| DIN abrasion (mm$^3$) | 200 | 200 | 280 | 200 |
| MFI 5 kg/190° C. (g/10 min) | 116 | 85 | 100 | 85 |
| Tensile strength (Mpa) | 7.5 | 7.5 | 9 | 7.5 |
| Elongation (%) | 260 | 340 | 380 | 340 |

The following methods have been used for measuring the properties appearing in these examples:
1. Hardness Shore: ASTM-D 2240
2. Abrasion: DIN 53516
3. Melt Flow (M15): ASTM-D 1238 revised 89, at 190° C. and under a load of 5 kg.
4. Tensile and Elongation: ASTM-D 412, D 638, D 882

What is claimed is:

1. A process for the production of a cork for liquid containers comprising providing a masterbatch which comprises:
   (a) from 20 to 60 wt. % of a thermoplastic elastomer re resulting from the copolymerization of a vinylaromatic monomer and a conjugated diene monomer containing from 80 to 20 wt. % of the vinylaromatic polymer and 20 to 80 wt. % of the conjugate diene polymer;
   (b) from 8 to 30 wt. % of a vinylaromatic polymer, other than the thermoplastic elastomer of subparagraph (a);
   (c) from 10 to 30 wt. % of at least one processing aid which decreases the viscosity of the masterbatch allowing improved processing speed;
   (d) optionally up to 20 wt. % of one or more additives selected from the group consisting of lubricity agents, which improve the introduction of the cork in containers and fillers;
   (e) a blowing agent; and
   (f) molding said masterbatch to form a cork.

2. A process according to claim 1 wherein the thermoplastic elastomer is composed of styrenic and butadienic units.

3. A process according to claim 1 wherein the amount of styrene in the elastomer is between 25 to 80 wt. % and the amount of butadiene in the elastomer is from 75 to 20 wt. %.

4. A process according to claim 1 wherein the vinylaromatic polymer is polystyrene.

5. A process according to claim 1 wherein the polystyrene is a mixture of high impact and general purpose polystyrene in an amount from 8 to 25 wt. %.

6. A process according to claim 1 wherein the processing aid is a mixture of naphthenic and paraffinic oil in an amount of 15 to 27 wt. %.

7. A process according to claim 1 wherein the lubricity agent is calcium stearate.

8. A process according to claim 1 comprising a filler in an amount of less than 10%.

9. A process according to claim 8 wherein the filler is calcium carbonate.

10. A process according to claim 1 wherein the blowing agent is a physical blowing agent.

11. A process according to claim 10 wherein the blowing agent is a polymer bead containing isobutane.

12. In a process for the production of a cork for liquid containers, one step of the process comprising mixing:
   (a) from 20 to 60 wt. % of a thermoplastic elastomer resulting from the copolymerization of a vinylaromatic monomer and a conjugated diene monome containing from 80 to 20 wt. % of the vinylaromatic polymer and 20 to 80 wt. % of the conjugated diene polymer, (b) from 8 to 30 wt. % of a vinylaromatic polymer, other than the thermoplastic elastomer of subparagraph (a);

(c) from 10 to 30 wt. % of at least one processing aid which decreases the viscosity of the masterbatch allowing improved processing speed;

(d) optionally up to 20 wt. % of one or more additives selected from the group consisting of lubricity agents, which improve the introduction of the cork in containers and fillers; and (e) a blowing agent.

* * * * *